United States Patent [19]

McCague

[11] Patent Number: 4,713,106
[45] Date of Patent: Dec. 15, 1987

[54] METHOD AND APPARATUS FOR CONVEYING MOLTEN MATERIAL

[75] Inventor: John A. McCague, Newark, Ohio

[73] Assignee: Owens-Corning Fiberglas Corporation, Toledo, Ohio

[21] Appl. No.: 853,511

[22] Filed: Apr. 18, 1986

[51] Int. Cl.⁴ .............................................. C03B 5/26
[52] U.S. Cl. ........................................ 65/128; 65/134; 65/324; 65/356
[58] Field of Search ............... 65/1, 2, 12, 134, 324, 65/128, 126, 356

[56] References Cited

U.S. PATENT DOCUMENTS

| | | |
|---|---|---|
| 2,212,528 | 8/1940 | Slayter . |
| 2,294,266 | 8/1942 | Barnard ................................ 65/1 |
| 2,563,080 | 8/1951 | Stalego . |
| 2,626,484 | 1/1953 | Stalego . |
| 2,714,622 | 8/1955 | McMullen ......................... 65/1 X |
| 3,015,842 | 1/1962 | Stalego . |
| 3,066,504 | 12/1962 | Hartwig et al. ..................... 65/1 |
| 3,282,668 | 11/1966 | Mabru ................................ 65/12 |
| 3,331,673 | 7/1967 | Bour ............................. 65/134 X |
| 3,771,982 | 11/1973 | Dobo .................................. 65/1 |
| 3,985,530 | 10/1976 | Hynd .................................. 65/1 |

Primary Examiner—Robert L. Lindsay
Attorney, Agent, or Firm—Ted C. Gillespie; Thomas F. McGann

[57] ABSTRACT

A vertical standpipe which has an internal fitting. The standpipe conveys a molten glass stream from a molten bath in a furnace forehearth to a spinner below the forehearth. The internal fitting has an orifice positioned so as to maintain a spaced-apart relationship between the interior surface of the standpipe and the molten glass stream issuing from the orifice. The mass flow rate of the molten glass stream is throttled by variable cooling means in the vicinity of the orifice.

11 Claims, 5 Drawing Figures

METHOD AND APPARATUS FOR CONVEYING MOLTEN MATERIAL

TECHNICAL FIELD

This invention pertains to containers such as furnaces for melting or containing molten thermoplastic materials. In one of its more specific aspects, this invention pertains to bushings for conveying molten material from the inside to the outside of the furnace for further processing. A particular application for this invention is conveying of molten glass through a production bushing or a drain bushing.

BACKGROUND OF THE INVENTION

Methods and apparatus for melting glass in a furnace, hereinafter referred to as a melter, and conveying the molten glass out of the melter through a bushing for delivery to subsequent processing apparatuses are well-known. In general, pre-mixed glass batch materials are fed into a melter where the materials are melted into glass by heat sources such as gas flame, electric arc, or electrical resistance. The molten glass is usually passed from a melter through a conditioning chamber to a forehearth, where the glass is maintained in a molten state.

The molten glass is conveyed from the container such as the forehearth by bushings that are mounted to the bottom wall of the forehearth. A stream of glass issues from the bushing and falls into or onto subsequent processing apparatuses such as a glass fiber centrifugal spinner, or into a cullet chute if the molten glass is not to be processed further.

Typical forehearths in the glass fiber industry are lined with refractory material and configured to maintain a depth of about six to eight inches of molten glass above the refractory floor. The bottom wall is about five inches thick, and the refractory floor contains bushing wells onto which are mounted the bushings that convey the molten glass from the forehearth to spinners or to cullet chutes.

A forehearth performs a number of functions, such as:
  conveying molten glass from the melting furnace to a subsequent processing location,
  providing a smaller, hence less hazardous hydraulic head over the bushing than does the melting furnace,
  uniforming the glass temperature by mixing the glass, destroying temperature stratification, and
  allowing bubbles to rise out of the molten glass.

The level of molten glass in a forehearth is determined by the mass flow rate from the melter, and by the mass flow rate from the bushings, called throughput. The flow rate from the melter is controlled by controlling the batch feed rate to the melter, or if so equipped, by a needle throttling device on the melter. The forehearth level is usually sensed by a pressure differential device that utilizes an air bubble generator to propel air through a tube below the surface of the melt, causing bubbles to rise up through the molten glass. The pressure required to force the bubbles out of the tube is proportional to glass depth, and the pressure signal is used to control batch feed or needle valve setting.

Bushings used in the glass industry are usually fabricated from heat resistant precious metal alloys and configured with lugs or ears to which are connected electrical power clamps. The bushing is encased in a protective refractory insulation casing with the ears protruding through the refractory casing. Varying the power to a bushing will vary the temperature of the bushing and therefore the temperature of the glass at or in the bushing. Raising the power level will decrease the glass viscosity, increasing the throughput. Lowering the power level will have the opposite effect. Accordingly, throughput can be throttled by bushing power setting. Bushing throughput can be reduced to zero by lowering the power setting sufficiently.

Electrically powered bottom-feed bushings mounted to the floor of the container have certain disadvantages:
  Refractory debris called stones travel along the floor of the forehearth into the well and through the bushing to the spinner, affecting the processing and quality of the glass fibers. If large enough, the stones may block the bushing and affect throughput.
  Power and power equipment are costly.
  Power outages will decrease or stop throughput.
  Power equipment can present an electrical hazard in the wet environment of glass processing operations.
  The bottom glass in the forehearth is not as hot nor as clean as the glass at the top surface of the glass in the forehearth.

This invention overcomes these disadvantages of bottom feed, electrically powered bushings and demonstrates additional utility not available in these bushings.

STATEMENT OF THE INVENTION

According to this invention there is provided a standpipe that is mounted to pass through the container bottom wall. An orificed fitting is mounted in the standpipe so that all molten material conveyed out of the container will pass through the fitting and subsequently through the standpipe without contacting the interior surface of the standpipe after the material passes through the fitting. The invention is advantageous because it does not require power and therefore can be less costly to fabricate and safer to operate. Additionally, when employing the preferred top-feed method, product quality and process efficiency are improved, and inherent molten material level control is provided.

In the preferred embodiment of the invention, cooling means are provided to cool the fitting to adjust the temperature of the molten material thereby throttling the flow through the fitting.

In another preferred embodiment, cooling fluid is directed toward the fitting via a conduit.

In another preferred embodiment, a baffle is mounted near the level of the orifice to define a cooling chamber, the baffle being equipped with a hole to allow passage of the molten material therethrough.

In another embodiment, the fluid conduit contacts the surface of or is fabricated into the fitting.

In another embodiment, a flame source is mounted inside the standpipe to exclude oxygen therein.

In another preferred embodiment, the orifice is positioned below the top opening of the standpipe.

In another embodiment, the top of the standpipe is mounted at the floor level of the container.

In another preferred embodiment, the standpipe is cylindrical.

In another preferred embodiment, the fitting is a truncated cone.

In another preferred embodiment, the standpipe is a right circular cylinder, the fitting is a right circular cone frustum, and the fitting is mounted in the top of the standpipe, and coaxially with the standpipe.

In this invention there is also provided a method for conveying molten material from a container into a vertical standpipe, guiding the molten material through the orifice of a fitting mounted in the standpipe, the orifice being spaced apart from the interior surface of the standpipe, and conveying the material through the standpipe without substantial contact with the interior surface of the standpipe after the material passes through the orifice.

In the preferred method of this invention, the fitting is cooled to adjust the temperature of the molten material passing through the orifice.

DESCRIPTION OF THE INVENTION

This invention is described in terms of a process for manufacturing glass fibers. The invention is suitable for use in any process involving thermoplastic material that is melted and conveyed out of the melter. The invention is described in terms of the best mode without meaning to limit it thereto.

Figure 1:
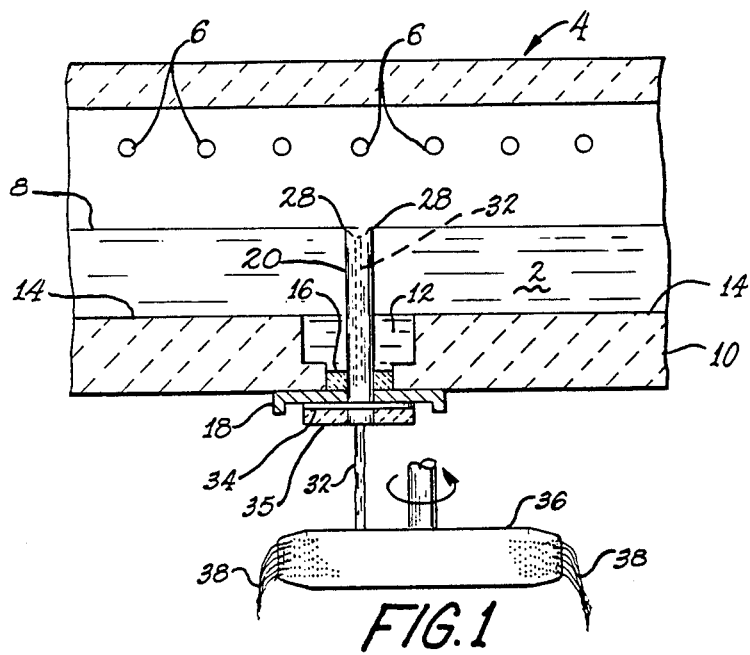
FIG. 1 is a schematic, cross-sectional, view in elevation of the standpipe mounted in the forehearth showing the top of the standpipe at the level of the molten matrial surface.

Referring to FIG. 1, molten glass 2 is contained in a container such as forehearth 4. Other containers such as melters, conditioners and feeders may be employed. Gas burners 6 maintain the proper glass temperature by radiating heat to glass surface 8. The forehearth has a refractory insulation bottom wall 10 in which are located optional bushing wells 12. These wells are usually in-line along the longitudinal center line of the forehearth floor 14. The number of bushing wells, or positions, may vary from about 7 to about 12 in a glass fiber insulation machine. Bushing orifice block 16 is mounted in the bushing well and held in place by orifice block plate 18. The plate is fastened to the forehearth bottom wall by conventional fasteners (not shown) such as bolts, nuts, and clamps and rings. Standpipe 20 is positioned vertically and is mounted to the orifice block plate so as to pass through the orifice block and preferably extend to the surface of the molten glass when the glass is at the minimum desired depth.

Figure 2:
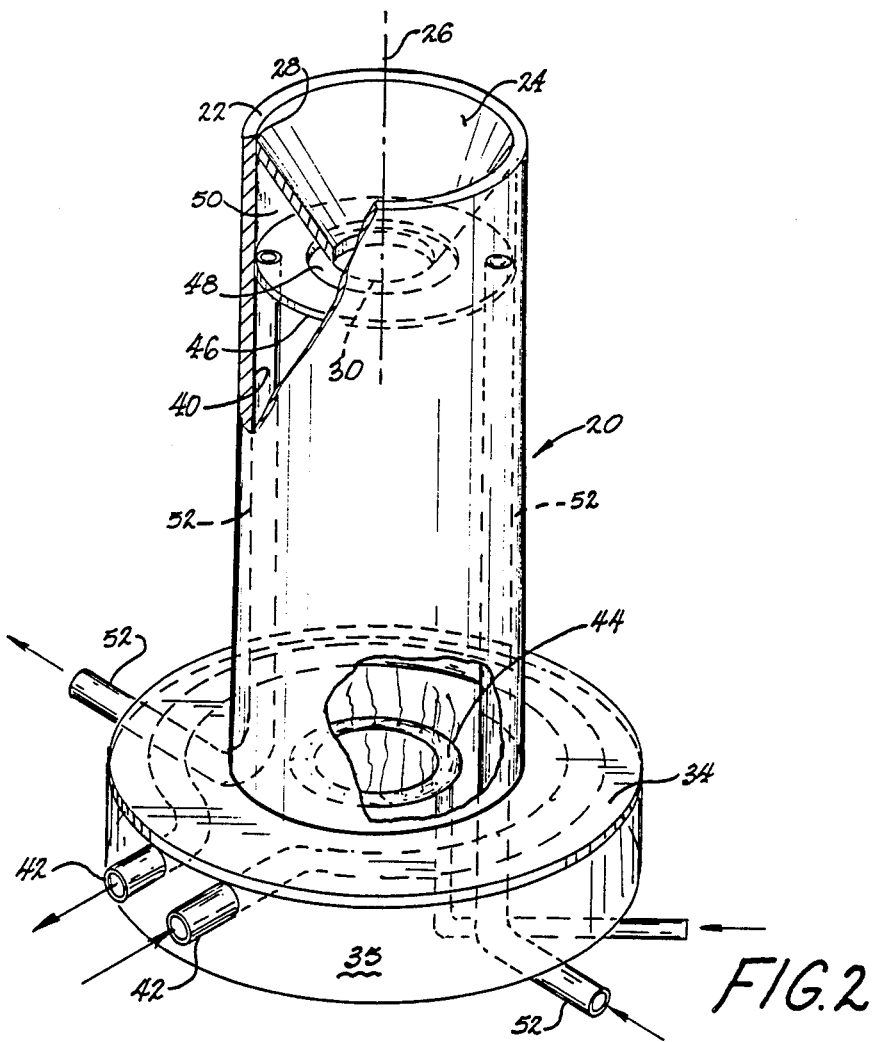
FIG. 2 is a pictorial view with a partial cutaway showing the standpipe, fitting, standpipe base, fluid conduits, baffle, and refractory insulation casing.

Referring to FIGS. 1 and 2, the standpipe top opening 22 is equipped with a fitting 24. The longitudinal axes 26 of the fitting and the standpipe coincide. The molten glass flows into the standpipe over lip 28, into the fitting, and emerges from orifice 30 as stream 32. The stream falls through the standpipe, emerging from the forehearth through base 34, and falls into any desired processing equipment such as glass fiber spinner 36 in which the molten glass is centrifuged into glass fibers 38.

Referring to FIG. 2, the orifice is spaced apart from the standpipe interior surface 40 so as to prevent contact between the molten glass stream and the standpipe interior surface as the stream falls through the standpipe. Because there is no contact between the molten glass stream 32 and the standpipe interior surface, there is no possibility that the glass stream will contact a cold surface and freeze-off, inhibiting or preventing the stream from flowing from the standpipe.

The standpipe preferred shape is a right circular cylinder, and the fitting preferred shape is a right circular cone frustum. The preferred location of the fitting is in the top opening of the standpipe. However, and suitable combination of shapes, dimensions, hole sizes, relative locations and axis orientations may be used that will permit the molten glass stream 32 to be continuously conveyed unencumberedly from the orifice to the spinner without contact with the standpipe interior surface 40. The preferred height of the standpipe will depend on the minimum desired glass depth in the forehearth. The standpipe diameter will depend on the orifice diameter. The orifice diameter will depend on the throughput desired. The baffle hole and cooling conduit sizes will depend on the orifice diameter.

The standpipe usually has a base 34 which is mounted on the orifice block plate by conventional fasteners (not shown) such as bolts, nuts, clamps and rings. The base is equipped with a cooling water loop 42 mounted in contact with the bottom of the base. The base is encapsulated in a refractory insulation casing 35. The cooling loop and the refractory insulation encapsulation are standard practices in the glass industry.

The preferred material for the standpipe, fitting and base is platinum alloy. It may be possible to use less expensive refractory metals such as molybdenum if air is excluded from the metal surface environment. An inert gas such as nitrogen or a reducing gas such as hydrogen may be used with molybdenum.

It is usually necessary to have the capability to control the throughput of the forehearth positions. Throughput of the prior art bushings is controlled by varying the electrical power input to individual bushings. Throughput for the standpipe of this invention is controlled by localized cooling in the vicinity of orifice 30. This can be accomplished by directing cooling fluid toward the fitting 24. Any suitable fluid may be used, but the preferred cooling fluid is air. If alloy volatization or corrosion problems are encountered with air, an inert or reducing gas can be employed. Steam may also be a suitable cooling fluid in certain applications.

Another method to deal with alloy degradation in the presence of air involves employment of a gas burner flame ring inside the standpipe near the base to exclude oxygen from the atmosphere that the refractory metals will see inside the standpipe. Flame ring 44 is shown in FIG. 2. The preferred material for this burner is also platinum alloy. Any suitable burner design may be used.

Referring to FIG. 2, baffle 46, having a hole 48 therein, is mounted near the level of orifice 30, defining cooling chamber 50. Fluid conduits 52, preferably two in number, are positioned to deliver cooling fluid into the cooling chamber, cooling the fitting in the vicinity of orifice 30. Adjustment of the flow rate of the cooling fluid will affect the viscosity of the glass in the vicinity of the orifice, affecting flow rate. Baffle hole 48 is preferrably round, coaxial with orifice 30, and preferrably larger than the orifice to preclude contact between the baffle and glass stream 32 issuing from the orifice.

Figure 3:
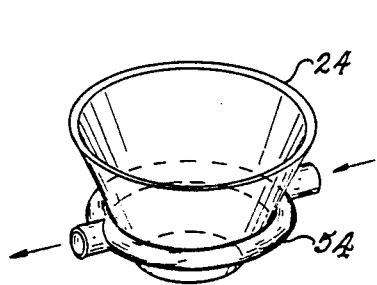
FIG. 3 is a pictorial view of the fitting and orifice cooling loop.
Figure 4:
FIG. 4 is a pictorial view with a partial cutaway showing the fitting and cooling manifold.

Referring to FIGS. 3, and 4, it is possible to place a closed orifice cooling loop 54 around and in contact with the fitting in the vicinity of the orifice, or to fabricate cooling manifolds 56 inside the fitting, which manifolds are connected to the cooling fluid conduits.

The preferred material for the baffle and the conduits is also platinum alloy.

Figure 5:
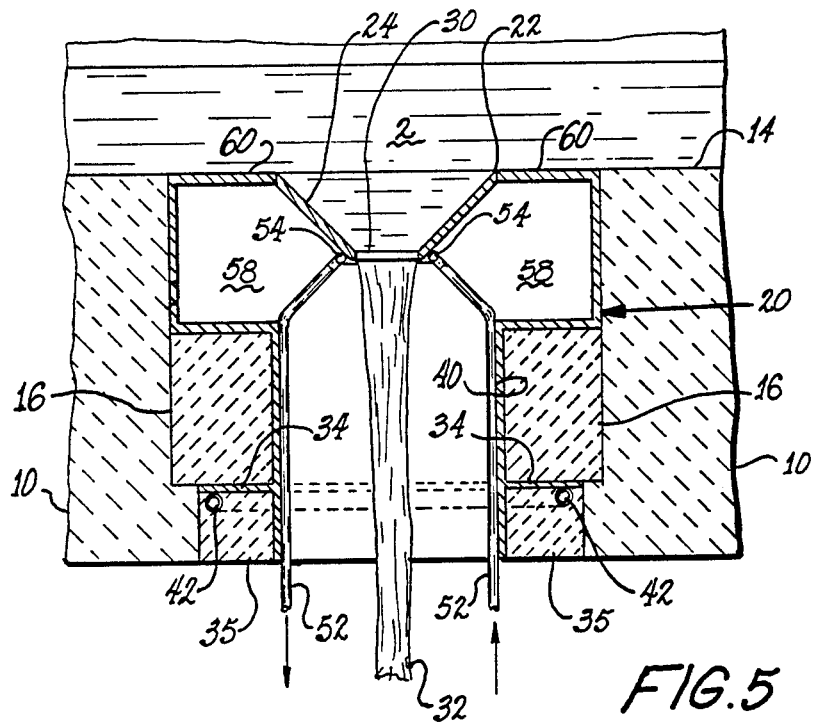
FIG. 5 is a schematic, cross-sectional, elevation view of the standpipe mounted in the forehearth showing the top of the standpipe at the level of the floor of the forehearth.

FIG. 5 shows standpipe 20 with top opening 22 positioned at the forehearth floor level 14. Fitting 24 is mounted in the top opening of the standpipe and orifice 30 is positioned below the top opening. Orifice cooling loop 54 is in contact with the fitting in the vicinity of the orifice. The standpipe has a flared section 58 and a top cover 60. This standpipe configuration would be used as a device to drain the forehearth. The draining molten glass stream 32 is started by stopping flow of cooling fluid, preferrably water, to the orifice cooling loop 54, and the stream is stopped by restoring the cooling fluid flow. Throttling the draining stream is also possible by throttling the cooling fluid flow. This bottom-feed standpipe may also be used to supply molten glass to processing equipment if forehearth floor conditions such as the presence of refractory debris do not militate against such use.

It can be seen when comparing FIGS. 1 and 5 that it is possible to locate the standpipe top opening at any level between the forehearth floor and the glass surface. The level of the top opening will determine the minimum level of molten material at which the forehearth can be operated according to the invention.

It is evident from the foregoing that various adjustment and modifications can be made to this invention. Such, however, are within the scope of this invention.

I claim

1. An apparatus for conveying molten glass from a container comprising:
    (a) a substantially vertical standpipe mounted to pass through the bottom wall of said container to convey the molten glass to the outside of said container,
    (b) a fitting having an orifice, said fitting mounted in said standpipe os that substantially all the molten glass conveyed through said standpipe passes through said orifice, said orifice being spaced apart from the interior surface of said standpipe so as to prevent substantial contact between the molten glass and said interior surface after the molten glass passes through said orifice, and
    (c) cooling means for adjusting the temperating of the molten glass passing through said orifice, wherein said cooling means comprises a conduit for directing cooling fluid toward the bottom of said fitting.

2. The apparatus of claim 1 further comprising a baffle mounted within said standpipe near the level of said orifice to define a cooling chamber, said baffle having a hole for the passage of substantially all the molten glass therethrough, and wherein said conduit is mounted to direct cooling fluid into said chamber.

3. The apparatus of claim 1 further comprising a burner mounted inside said standpipe to exclude oxygen from the inside of said standpipe.

4. The apparatus of claim 1 wherein said fitting is shaped so that said orifice is below the top of said standpipe.

5. The apparatus of claim 1 wherein the top of said standpipe is located at the floor level of said container.

6. The apparatus of claim 1 wherein said standpipe is substantially cylindrical.

7. The apparatus of claim 4 wherein said fitting is a truncated cone.

8. An apparatus for oonveying molten glass from a container comprising:
    (a) a substantially vertical right circular cylinder standpipe having:
        (1) a top opening, and
        (2) an interior surface, said standpipe mounted to pass through the bottom wall of said container to convey the molten glass to the outside of said container, said standpipe extending into said container to an extent sufficient to reach the surface of the molten glass where the molten glass is at the minimum desired depth in said container,
    (b) a right circular cone frustum fitting having an orifice, said fitting mounted coaxially with and in said top opening so that substantially all the molten glass conveyed through said standpipe passes through said orifice, said orifice being spaced apart from said interior surface so as to prevent substantial contact between the molten glass and said interior surface, and
    (c) cooling means for adjusting the temperature of the molten glass passing through said orifice, wherein said cooling means comprises a conduit for directing cooling fluid toward the bottom of said fitting.

9. A method of conveying molten glass from a container comprising:
    (a) conveying the molten glass into the top opening of a substantially vertical standpipe;
    (b) guiding the molten glass through an orifice of a fitting mounted in said standpipe, said orifice being spaced apart from interior surface of said standpipe,
    (c) conveying the molten material through said standpipe to the outside of said container without substantial contact between the molten glass and said interior surface after the molten glass passes through said orifice, and
    (d) cooling said fittinq to adjust the temperature of the molten glass through said orifice.

10. The method of claim 9 in which said cooling step comprises directing cooling fluid toward the bottom of said fitting.

11. The apparatus of claim 1 in which said standpipe extends into said container to an extent sufficient to reach the surface of the molten glass where the molten glass is at the minimum desired depth in said container.

* * * * *